US012768780B2

(12) United States Patent
Wahlbrink et al.

(10) Patent No.: US 12,768,780 B2
(45) Date of Patent: Oct. 20, 2026

(54) OPTICAL MEASURING DEVICE

(71) Applicant: Drager Safety AG & Co. KGaA, Lübeck (DE)

(72) Inventors: Günter Wahlbrink, Lübeck (DE); Arne Tröllsch, Lübeck (DE); Jörn Sunkel, Lübeck (DE); Andreas Flammiger, Lübeck (DE); Raulin Edgar Batchadji, Lübeck (DE); Jonas Lölsberg, Lübeck (DE)

(73) Assignee: DRAGER SAFETY AG & CO. KGAA, Lübeck (DE)

( * ) Notice: Subject to any disclaimer, the term of this patent is extended or adjusted under 35 U.S.C. 154(b) by 183 days.

(21) Appl. No.: 18/429,660

(22) Filed: Feb. 1, 2024

(65) Prior Publication Data

US 2024/0264075 A1 Aug. 8, 2024

(30) Foreign Application Priority Data

Feb. 6, 2023 (DE) ..................... 10 2023 102 768.9

(51) Int. Cl.
*G01N 21/3504* (2014.01)
*G01N 21/01* (2006.01)
(Continued)

(52) U.S. Cl.
CPC ......... *G01N 21/3504* (2013.01); *G01N 21/01* (2013.01); *G01N 21/031* (2013.01);
(Continued)

(58) Field of Classification Search
CPC .. G01N 21/3504; G01N 21/01; G01N 21/031; G01N 21/255; G01N 21/31;
(Continued)

(56) References Cited

U.S. PATENT DOCUMENTS 2,930,893 A * 3/1960 Carpenter .......... G01N 21/3504 250/338.5
3,250,174 A * 5/1966 Lutz ..................... G01N 21/314 250/389
(Continued)

FOREIGN PATENT DOCUMENTS

CN 202083627 U * 12/2011 ............. G01N 21/31
CN 103411921 A * 11/2013 ......... G01N 21/3504
(Continued)

OTHER PUBLICATIONS

Dong, Lulu, et al. "A high-sensitive methane measuring telemetry system based on a direct optical absorption technique." Laser Physics 30.12 (2020): 126201. (Year: 2020).*

*Primary Examiner* — Michelle M Iacoletti
*Assistant Examiner* — Noah J. Haney
(74) *Attorney, Agent, or Firm* — McGlew and Tuttle, P.C.

(57) ABSTRACT

An optical measuring device determines a concentration of measurement gas in a sample gas by light absorption. The optical measuring device includes a light source, a deflecting mirror, a primary mirror, a secondary mirror and a radiation detector. A section between the light source and the deflecting mirror is configured to receive the sample gas. The light source is configured to emit light in the direction of the deflecting mirror. The deflecting mirror is configured to act as a collimator for incident light and to deflect the incident light in the direction of the primary mirror. The primary mirror and the secondary mirror are configured to direct the light deflected by the deflecting mirror onto the radiation detector.

19 Claims, 3 Drawing Sheets

(51) Int. Cl.

| | |
|---|---|
| ***G01N 21/03*** | (2006.01) |
| ***G01N 21/17*** | (2006.01) |
| ***G01N 21/25*** | (2006.01) |
| ***G01N 21/31*** | (2006.01) |
| ***G01N 21/33*** | (2006.01) |
| *G01S 17/88* | (2006.01) |

(52) U.S. Cl.

CPC ........... *G01N 21/255* (2013.01); *G01N 21/31* (2013.01); *G01N 21/33* (2013.01); *G01N 21/0303* (2013.01); *G01N 2021/0314* (2013.01); *G01N 2021/036* (2013.01); *G01N 2021/1795* (2013.01); *G01N 2021/3155* (2013.01); *G01N 2021/3513* (2013.01); *G01N 2201/0633* (2013.01); *G01N 2201/0636* (2013.01); *G01N 2201/08* (2013.01); *G01S 17/88* (2013.01)

(58) Field of Classification Search

CPC ............... G01N 21/33; G01N 21/0303; G01N 2021/0314; G01N 2021/036; G01N 2021/1795; G01N 2021/3155; G01N 2021/3513; G01N 2201/0633; G01N 2201/0636; G01N 2201/08; G01S 17/88

USPC .......................................................... 356/437

See application file for complete search history.

(56) References Cited

U.S. PATENT DOCUMENTS

| | | | | |
|---|---|---|---|---|
| 3,887,263 | A * | 6/1975 | Thompson, III | G02B 26/10 250/203.1 |
| 4,404,468 | A * | 9/1983 | Kleinschmidt | G08B 13/193 250/342 |
| 5,255,073 | A | 10/1993 | Wallin et al. | |
| 5,923,035 | A * | 7/1999 | Winkler | G01N 21/3504 250/353 |
| 2003/0016539 | A1* | 1/2003 | Minano | G02B 19/0028 362/348 |
| 2008/0259340 | A1* | 10/2008 | Prasad | G01N 21/3518 73/1.06 |
| 2016/0084755 | A1* | 3/2016 | Tripathi | G01N 21/65 73/49.7 |
| 2016/0187542 | A1* | 6/2016 | Childers | G02B 6/44 250/492.1 |
| 2016/0274025 | A1* | 9/2016 | Skibo | G06N 3/006 |
| 2020/0124477 | A1* | 4/2020 | Thorpe | G01N 21/274 |
| 2025/0155673 | A1* | 5/2025 | Hawker | G02B 7/1827 |

FOREIGN PATENT DOCUMENTS

| | | | | | |
|---|---|---|---|---|---|
| CN | 104007069 | A | * | 8/2014 | G01N 21/31 |
| CN | 209182227 | U | * | 7/2019 | G01N 21/27 |
| CN | 112903608 | A | * | 6/2021 | G02B 17/0896 |
| CN | 114460037 | A | * | 5/2022 | G01N 21/01 |
| DE | 2320166 | A1 | * | 10/1973 | G01J 3/44 |
| DE | 3823021 | A1 | * | 3/1990 | G02B 17/0896 |
| DE | 19611290 | C2 | * | 4/1998 | G01N 21/39 |
| DE | 19713928 | C1 | * | 4/1998 | G01N 21/3504 |
| EP | 3504535 | B1 | * | 10/2021 | G01N 21/031 |
| JP | S5527946 | A | * | 2/1980 | G01N 21/39 |
| WO | WO-9416311 | A1 | * | 7/1994 | G01N 21/3504 |
| WO | 2016200274 | A1 | | 12/2016 | |

* cited by examiner

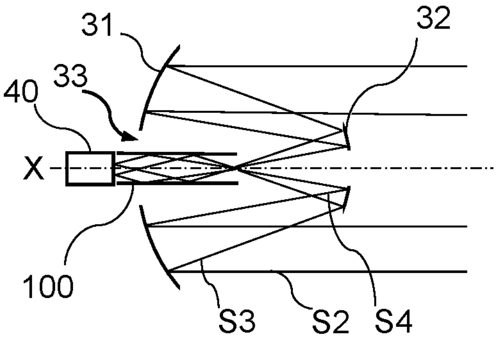
Fig. 4
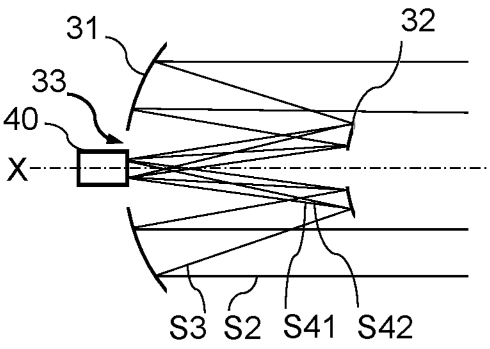
Fig. 5
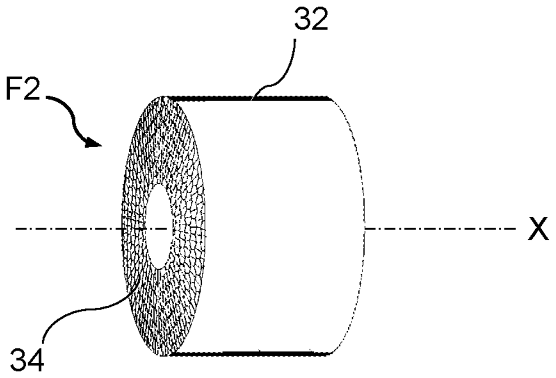
Fig. 6
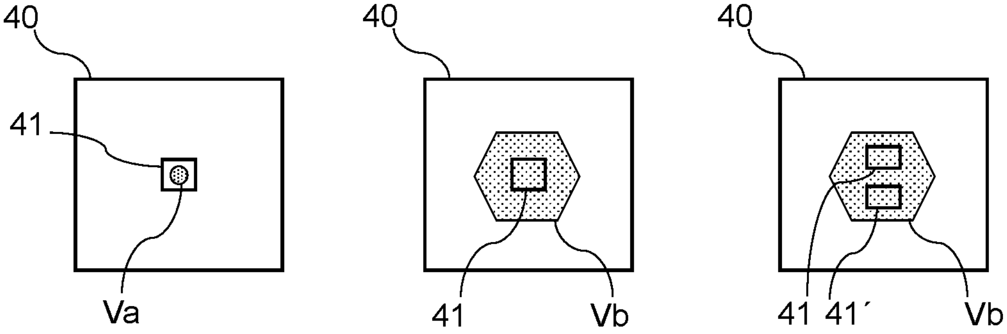
Fig. 7a
Fig. 7b
Fig. 7c

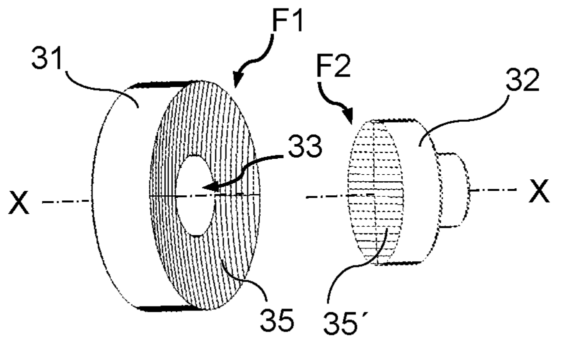
Fig. 8
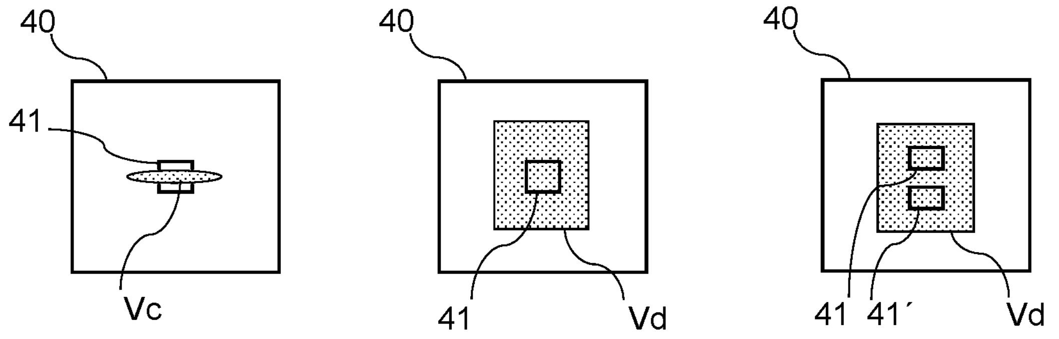
Fig. 9a
Fig. 9b
Fig. 9c
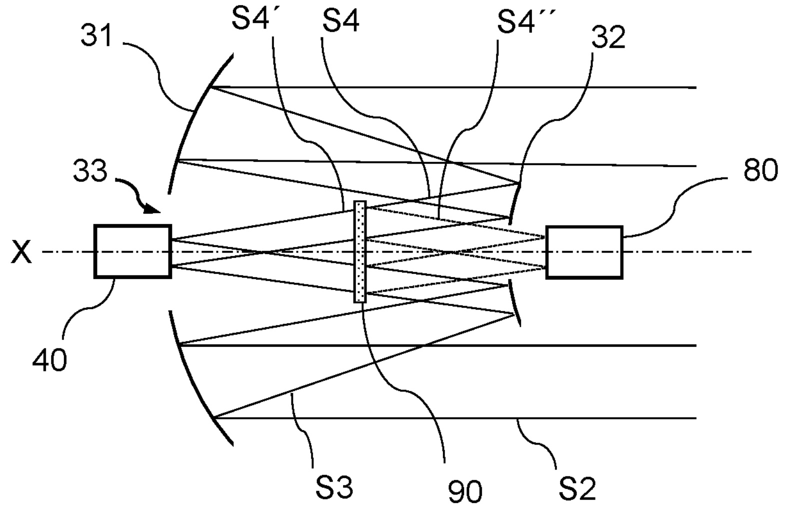
Fig. 10

OPTICAL MEASURING DEVICE

CROSS REFERENCE TO RELATED APPLICATIONS

This application claims the benefit of priority under 35 U.S.C. § 119 of German Application 10 2023 102 768.9, filed Feb. 6, 2023, the entire contents of which are incorporated herein by reference.

TECHNICAL FIELD

The present invention relates to an optical measuring device for determining the concentration of measurement gas in a sample gas by light absorption.

BACKGROUND

Optical measuring devices for determining the concentration of measurement gas (target gas) in a sample gas by light absorption are known. These usually comprise a light source, a section (for example an optical cuvette) in which the sample gas is located and a radiation detector that detects light of a measurement wavelength through one or more optical bandpass filters. The absorption of the light by the measurement gas to be detected in the sample gas is a measure of its concentration. The intensity of the light detected at the radiation detector is determined in particular by the absorption properties of the sample gas and by the optical path length through the section in which the sample gas is located.

In general, there is a need to provide an optical measuring device that delivers particularly stable measured values.

In this respect, in an optical measuring device known from DE 197 13 928 C1, a light source is provided which casts light through an infrared-transmissive window onto a plane mirror outside a housing of the optical measuring device. The plane mirror reflects the light so that it re-enters the housing through another area of the infrared-transmissive window, where it falls onto a beam splitter. In order to provide the most stable measured values possible, optical concentrators are provided in front of a radiation detector to focus the light in the direction of the radiation detector. This creates a uniform distribution of radiation in the plane of the radiation detector.

The disadvantage of this known measuring device is that the optical concentrator must have a certain minimum length in order to effectively achieve uniform radiation distribution. This results in a relatively large installation space for the known optical measuring device.

Other optical measuring devices are known from DE 196 11 290 C2, DE 23 20 166, U.S. Pat. No. 5,255,073 A, EP 3 504 535 B1, WO 2016/200 274 A1, CN 2 09 182 227 U and JP S55-27 946 A.

SUMMARY

It is an object of the invention to provide an alternative optical measuring device, in particular an optical measuring device which has a compact design.

These and other objects are attained by an optical measuring device as disclosed herein.

The present invention relates to an optical measuring device for determining the concentration of measurement gas in a sample gas by light absorption.

Advantageous embodiments are disclosed herein.

According to the invention, an optical measuring device for determining the concentration of measurement gas in a sample gas by light absorption is proposed. The optical measuring device comprises a light source, a deflecting mirror, a primary mirror, a secondary mirror and a radiation detector. A section between the light source and the deflecting mirror is configured to receive the sample gas. The light source is configured to emit light in the direction of the deflecting mirror. The deflecting mirror is configured to act as a collimator for incident light and to deflect the incident light in the direction of the primary mirror. The primary mirror and the secondary mirror are configured to direct the light deflected by the deflecting mirror onto the radiation detector.

The proposed optical measuring device solves the task according to the invention by providing an optical system in which the beam path (radiation path) runs from the light source via the deflecting mirror, the primary mirror and the secondary mirror to the radiation detector (in particular in the order mentioned). In particular by providing a primary mirror and a secondary mirror, i.e. by providing a telescope arrangement as part of the optical system, a compact design can be advantageously achieved, whereby the optical system at the same time advantageously has a high focal length. A high focal length offers the advantage that an angle of incidence distribution on the radiation detector is narrow, i.e. small. This improves the measuring properties of the optical measuring device, especially when using one or more bandpass filters or double bandpass filters.

A further advantage of the optical measuring device according to the invention is that the light passes through the section for absorbing the sample gas twice, as the deflecting mirror deflects the light emitted by the light source in the direction of the primary mirror and the light thus passes through the section a second time. In this way, an absorption distance can be doubled compared to an arrangement in which no deflection takes place. This in turn allows an advantageous increase in the measuring sensitivity of the optical measuring device.

According to the invention, a sample gas is understood to be a gas or gas mixture which can have one or more measurement gases as a component of the sample gas. For example, the sample gas can be air and the measurement gas can be a hydrocarbon.

According to the invention, a light source refers to a component which is configured to emit light comprising ultraviolet radiation and/or infrared radiation. For the purposes of the invention, light thus refers to electromagnetic radiation comprising at least ultraviolet radiation and/or infrared radiation.

According to the invention, ultraviolet radiation is understood to mean electromagnetic radiation with a wavelength of 10 nm to 400 nm, preferably from 100 nm to 380 nm.

According to the invention, infrared radiation is understood to mean electromagnetic radiation with a wavelength of 0.750 μm to 1000 μm.

The wavelength used in the context of the invention or a wavelength range used in the context of the invention can be predetermined depending on the measurement gas or gases to be detected.

The light source according to the invention can emit the light in a broadband manner—for example, in that the light source is configured as an incandescent lamp—or in a narrowband manner, for example, in that the light source is configured as a light-emitting diode or as a laser diode.

The light source according to the invention is configured directly or indirectly to emit the light in the direction of the deflecting mirror. For example, the light source can have a reflector, such as a concave mirror, or a lens for this purpose.

According to the invention, a radiation detector is understood to be a component that is configured to detect light in the ultraviolet and/or infrared wavelength range, in particular the measuring wavelength. For this purpose, the radiation detector has a detector element.

The radiation detector can have an interference filter, so that in a preferred embodiment the optical measuring device according to the invention relates to a non-dispersive optical measuring device, in particular a non-dispersive infrared analyzer, which is less cross-sensitive to gases contained in the sample gas in addition to the measurement gas or gases due to the use of a gas-specific interference filter with band-pass characteristics.

The detector element of the radiation detector can, for example, be configured as a semiconductor detector, a pyroelectric detector, a thermoelectric detector or a thermal detector.

Additional sensors, such as a temperature sensor, a humidity sensor and/or a pressure sensor, can be provided in or on the optical measuring device, for example on the radiation detector, to take account of and compensate for environmental influences.

The deflecting mirror according to the invention acts as a collimator for incident light, by which it is understood according to the invention that the incident light is reflected essentially collinearly to an optical axis of the deflecting mirror in the direction of the primary mirror.

The section between the light source and the deflecting mirror is configured to accommodate the sample gas and has an optical path length. The section can be provided by a measuring cuvette, whereby the section can be bounded laterally by side walls of the measuring cuvette and sample gas can enter the section through an opening in the measuring cuvette. Alternatively, the section can also be provided by an open measuring system, i.e. essentially without side walls.

The optical elements (i.e. the components and structural elements that influence the propagation of light), in particular the deflecting mirror, primary mirror, secondary mirror and reflector or lens, if present as part of the light source, can be made of glass, plastic, metal, including semi-metal (e.g. silicon) or other materials (e.g. chalcogenides), for example.

Preferably, the primary mirror according to the invention and the secondary mirror according to the invention together form an imaging system which images the incident light onto the radiation detector. Preferably, the radiation detector is arranged in the area of a focus of the imaging system. Alternatively, the radiation detector can be arranged outside a focus.

According to the invention, the respective optical axes of the light source, deflecting mirror, primary mirror and secondary mirror are collinear to one another.

This arrangement of the optical elements achieves a folding of the beam path into itself by reflecting the light, which essentially passes collinearly from the deflecting mirror to the primary mirror, from the primary mirror to the secondary mirror and from this to the radiation detector. This makes it possible to achieve a particularly compact design while ensuring a long focal length.

The collinear configuration of the respective optical axes of the light source, deflecting mirror, primary mirror and secondary mirror also results in a symmetrical angle of incidence distribution, so that the radiation distribution is homogeneous. This advantageously improves the measuring properties of the optical measuring device.

Furthermore, the radiation detector is particularly preferably located on the optical axis of the primary mirror and secondary mirror.

An optical axis is understood to be an imaginary line of symmetry that runs through the center of curvature of the respective optical element (light source, deflecting mirror, primary mirror, secondary mirror). Preferably, the respective optical axes and the center axis of the optical measuring device are identical.

According to the invention, the light source, the primary mirror, the secondary mirror and the radiation detector are arranged in a common housing, wherein the deflecting mirror is arranged outside the housing and wherein the housing comprises a light-transmitting window which is arranged in the beam path between the light source and the deflecting mirror.

In this way, sensitive components of the optical measuring device can be protected by a housing, making the optical measuring device robust. This is particularly advantageous for the use of the optical measuring device in harsh environments, for example offshore or in industrial environments.

The translucent window is used to physically close off the housing in the area of the beam path, while still allowing light to pass through. For this purpose, the window can comprise a translucent material, in particular one that is permeable to ultraviolet radiation and/or infrared radiation. Such a material can be, for example, a glass, a plastic or a mineral such as corundum (“sapphire glass”). The window can, for example, be configured as a pane or as a film. It is particularly preferable for the window to form a gas-tight seal with the surrounding housing.

It is particularly preferable for the housing to be encapsulated in a pressure-resistant manner so that the optical measuring arrangement can be provided with explosion protection.

In combination with the formation of the respective optical axes of the light source, deflecting mirror, primary mirror and secondary mirror collinear to each other, a particularly efficient use of the window can also be achieved. A light exit surface, through which light from the light source exits the window in the direction of the deflecting mirror and which in this case is essentially circular, is in this embodiment concentric to a light entry surface, through which light from the deflecting mirror enters in the direction of the primary mirror and which in this embodiment is essentially annular. In a suitable configuration of the optical measuring device, the annular surface surrounds the circular surface with no or only a small gap between them, so that essentially the entire surface of the window can be used for the passage of light. This is not the case with measuring devices known from the state of the art. In these, the light entry surface and light exit surface are elliptical, for example, and lie next to each other offset in the plane of the window, so that the remaining surface of the window remains unused. As a result, known measuring devices must have a large diameter and are consequently more expensive to manufacture. Accordingly, the optical measuring device according to the invention is advantageously cheaper to manufacture.

Preferably, a distance between the light source and the deflecting mirror is variable along the optical axis of the deflecting mirror in order to adjust an absorption length. This adjustment may be with a configuration with a support of the deflecting mirror being adjustably moveable relative to the housing. This may be motor actuated or manually actuated.

This makes it easy to change the absorption length of the optical measuring device, which allows the optical measuring device to be adapted to different measurement gases.

Preferably, the position of the deflecting mirror can be changed in relation to the housing in order to change the distance.

For example, the deflecting mirror can be accommodated in a linear guide, for example in a housing-side spacer that provides a corresponding linear guide. The distance can be changed by changing the position of the deflecting mirror in the linear guide.

In a further example, the deflecting mirror can be accommodated by a spacer on the housing side, whereby the spacer can be exchanged for another spacer of a different length and is therefore variable in length, or whereby the spacer is variable in length by means of adapter pieces that can be inserted between the spacer and the deflecting mirror. The distance can be changed by changing the length of the spacer.

Preferably, the deflecting mirror has a predetermined curvature corresponding to a first absorption length. Furthermore, the deflecting mirror is preferably interchangeable with another deflecting mirror having a different predetermined curvature, the other predetermined curvature being adapted to a second absorption length.

In an alternative embodiment to the interchangeable provision of the deflecting mirror, the deflecting mirror can have a variable curvature which can be adapted to the changed absorption length. Such deflecting mirrors are known. For example, there are elastic mirrors, such as silicone mirrors, which are filled or can be filled with a fluid, whereby the curvature of the mirror can be changed by changing the amount of fluid.

Preferably, the primary mirror and the secondary mirror are configured as a Cassegrain telescope arrangement.

In the context of the invention, it was recognized that such a Cassegrain telescope arrangement has a particularly high focal length with a simultaneously compact design in the direction of beam propagation.

In this respect, a Cassegrain telescope assembly is understood to mean all designs of telescope assemblies based on a Cassegrain configuration (Cassegrain reflector arrangement), including a Schmidt-Cassegrain telescope assembly, a Maksutov telescope assembly, a hypergraph telescope assembly and a Ritchey-Chrétien-Cassegrain telescope assembly.

It is particularly preferred that the Cassegrain telescope arrangement has no further optical elements, such as lenses or correctors, in addition to the primary mirror and the secondary mirror, which advantageously simplifies the design of the optical measuring device.

In the Cassegrain telescope arrangement, the primary mirror and secondary mirror can have essentially any shape, for example a respective optically effective surface can be spherical or aspherical, in particular parabolic, hyperbolic, elliptical or planar.

The secondary mirror is preferably not flat.

Preferably, the primary mirror is concave and the secondary mirror is convex. It is particularly preferred that the primary mirror is parabolic and the secondary mirror is hyperbolic (classic Cassegrain telescope arrangement) or that the primary mirror is hyperbolic and the secondary mirror is hyperbolic (Ritchey-Chrétien-Cassegrain telescope arrangement).

Particularly preferably, the primary mirror and the secondary mirror are configured as a Cassegrain telescope arrangement, while the respective optical axes of the light source, deflecting mirror, primary mirror and secondary mirror are configured collinear to each other. In other words, it is preferred to provide a symmetrical Cassegrain telescope arrangement.

Preferably, the primary mirror has a central recess in order to direct the light deflected by the secondary mirror through the central recess onto the radiation detector.

In other words, in this particularly preferred variant, the Cassegrain telescope arrangement is configured in such a way that a focus is located behind the primary mirror, which advantageously enables a particularly high focal length.

Preferably, the primary mirror has a holder (bracket) for holding the radiation detector, which is particularly preferably arranged in the recess. This makes it particularly easy to align the radiation detector with the primary mirror.

Preferably, the optical measuring device comprises a second light source which is configured to emit a second light in the direction of the radiation detector.

The second light can correspond to the wavelength or wavelength range of the light source or have a different wavelength or wavelength range.

The provision of a second light source makes it possible to compensate for drift of the radiation detector (e.g. due to thermal or ageing effects).

The second light source is particularly preferably arranged collinear to a central axis of the radiation detector. In this way, the radiation detector can be irradiated essentially perpendicularly, which advantageously leads to a symmetrical angle of incidence distribution.

For example, the secondary mirror can have a central recess. The second light source can be arranged in or behind this recess and irradiate the radiation detector under preferably vertical perpendicular incidence.

Preferably, the optical measuring device comprises a second radiation detector and a beam splitter, wherein the beam splitter is arranged in the beam path in front of the radiation detector in order to guide a portion of the light in the direction of the radiation detector and to guide another portion of the light in the direction of the second radiation detector.

In this way, the concentration of another measurement gas can be determined at the same time with little additional construction effort. As a result, the functionality of the optical measuring device can be advantageously improved.

The beam splitter is an optical element that splits the incident light into at least one (first) part and another (second) part. A further (third) part of the light can also be absorbed. The beam splitter can, for example, be configured as a partially transparent mirror or be constructed from prisms.

The beam splitter is preferably configured as a dichroic or trichroic beam splitter.

A dichroic or trichroic beam splitter influences the spectral composition of the incident light in that the transmitted light has a different spectrum than the light reflected by the beam splitter. The reflected light can, for example, reach the second radiation detector and thus correspond to a spectrum that is adjacent to the measuring wavelength or the measuring wavelength range (preferably on both sides). The transmitted light can, for example, reach the radiation detector and thus correspond to the measurement wavelength or the measurement wavelength range.

A dichroic or trichroic beam splitter can, for example, be provided as a mirror with an alternating layer structure, whereby metallic layers and dielectric layers can be arranged alternately on top of each other. In another variant, low refractive index and high refractive index dielectric layers can be arranged alternately on top of each other. The bandwidth of the transmitted light can be influenced by a suitable choice of layer structure.

A further advantage of providing a dichroic or trichroic beam splitter is its low degree of absorption, which has a particularly low impact on the light intensity.

Preferably, the radiation detector and/or the second radiation detector is a multi-channel detector.

A multi-channel detector is understood to be a radiation detector with at least two separate detector elements of the type described above, each of which generates a detector signal. For example, one detector element can be configured to detect the measurement wavelength or the measurement wavelength range and another detector element can be configured to detect a reference wavelength.

In this way, a radiation detector (or second radiation detector) can be provided in a compact manner, which is configured to generate several detection signals. This can be advantageous in order to compensate for drift of the radiation detector even with a compact design.

For example, a detector element can only detect light of a wavelength or a wavelength range that is absorbed by the measurement gas and thus form a measurement detector, and another detector element can only detect light from a spectrally adjacent range in which the measurement gas does not absorb, and thus form a reference detector. The ratio of the two detection signals only changes if sample gas is present in the section for absorbing the measurement gas. Contamination and other non-spectral changes in the radiant power generally affect both radiation detectors equally, so that the ratio remains constant in this case.

A bandpass filter or a double bandpass filter can be assigned to each detector element. Particularly preferably, the detector element that forms the measurement detector has a bandpass filter element that transmits light of the measurement wavelength or the measurement wavelength range. Furthermore, particularly preferably, the other detector element, which forms a reference detector, has a double bandpass filter element, which transmits light that is spectrally adjacent to both sides of the measurement wavelength or the measurement wavelength range.

Preferably, an optical surface of the secondary mirror and/or an optical surface of the primary mirror has structured sections in order to influence a radiation distribution on the radiation detector and/or a radiation distribution on the second radiation detector, in particular to increase the radiation distribution.

In this way, it can be ensured that the radiation detector and/or the second radiation detector is irradiated over the entire required area, e.g. in the area of the detector element or, in the case of the multi-channel detector, of the detector elements. Preferably, the optical surfaces are configured in such a way that the radiation distribution projects beyond the detector element(s) by a predetermined area. This ensures sufficient irradiation of the detector element or detector elements in the event of a displacement of the beam path due to shape and position tolerances of the optical measuring device.

Furthermore, the structured sections have the advantage that by influencing, in particular enlarging, the radiation distribution, a homogenization of the radiation distribution occurs, which leads to the fact that, for example, partial shadowing in the beam path does not only have a punctual effect and thus, for example, only on one detector element, but is distributed locally in the plane of the radiation detector, for example on two detector elements. Overall, the measuring properties of the optical measuring device can thus be improved.

An optical surface is understood to be a surface that is configured to influence the beam path and is therefore optically effective. An optical surface of the secondary mirror is therefore in particular a reflective surface of the secondary mirror. Accordingly, an optical surface of the primary mirror is in particular a reflective surface of the primary mirror.

The structured sections can extend over the entire optical surface or only take up part of the optical surface. Preferably, the optical surface of the primary mirror and/or the optical surface of the secondary mirror is completely provided with structured sections in order to influence the radiation distribution as effectively as possible.

Structured sections are sections of the optical surface that have a structure that deviates from the basic shape of the optical surface (e.g. spherical, hyperbolic or parabolic). From a geometric point of view, a structured section can be, for example, a depression or elevation with a predetermined shape relative to the basic shape of the optical surface.

In terms of manufacturing technology (production technology), the geometric shape of the primary mirror and/or the secondary mirror can, for example, be provided by a primary forming or reshaping process. For example, the primary mirror and/or the secondary mirror can be provided in its geometric shape by a primary forming process, such as injection molding. In another example, the primary mirror and/or the secondary mirror may be formed by machining processes or by surface etching with structured sections.

The structured sections are particularly preferably configured as facets and/or grooves.

In geometric terms, a groove is an elongated depression in the optical surface. The profile of the groove can be spherical or aspherically convex, for example.

For example, the profile of the recess can be essentially U-shaped or V-shaped.

Geometrically, a facet is understood to be a polygonal (preferably hexagonal) elevation or recess in the optical surfaces. The facet surface bounded by the edges of the facet can in turn be (spherical or aspherical) convex, (spherical or aspherical) concave and/or flat.

Preferably, the facet surface is spherically concave, as such structured sections are particularly advantageous in terms of fabrication, while at the same time contributing to a particularly homogeneous illumination of the radiation detector (or radiation detectors).

Only the primary mirror or the secondary mirror can have facets and/or grooves, or both the primary mirror and the secondary mirror can have facets and/or grooves.

Preferably, the primary mirror has structured sections in the form of grooves that run parallel to one another in a first orientation and the secondary mirror has structured sections in the form of grooves that run parallel to one another in a second orientation, and wherein the primary mirror and the secondary mirror are aligned with one another such that the first orientation and the second orientation are essentially perpendicular to one another. This makes it possible to generate an essentially rectangular radiation distribution on the radiation detector (or radiation detectors). By suitably configuring the structured sections, e.g. by suitably selecting the radius of curvature of the grooves, a rectangle of essentially any shape can be produced.

In an alternative embodiment, it is preferred that the primary mirror has facets and the secondary mirror does not have a structured surface. This simplifies the manufacture and assembly of the optical measuring device.

Preferably, the optical measuring device also has an optical waveguide, which is arranged in the beam path in front of the radiation detector.

In this respect, an optical waveguide is understood to be a component that bundles light entering the optical waveguide through an input opening and emits the bundled light from an output opening in the direction of the radiation detector. An example of an optical waveguide is a waveguide or an optical fiber.

Multiple reflection within the waveguide has the advantage of homogenizing the light distribution at the output aperture and thus on the detector element (or detector elements). This improves the measuring properties of the optical measuring device.

Preferably, the optical measuring device also comprises a second optical waveguide, which can be configured in the same way as the optical waveguide and which is arranged in the beam path in front of the second radiation detector. This configuration has analogous advantages to the waveguide.

These and other features and advantages can also be seen from the following description of the figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 4 is a schematic detailed view showing aspects of an embodiment of an optical measuring device according to the invention with an optical waveguide;

FIG. 5 is a schematic detailed view of an embodiment of an optical measuring device according to the invention with a secondary mirror with structured sections;

FIG. 6 is a perspective view of a secondary mirror according to the invention with structured sections;

FIG. 7*a* is a schematic detailed top view of a radiation detector according to the invention;

FIG. 7*b* is a schematic detailed top view of a radiation detector according to the invention;

FIG. 7*c* is a schematic detailed top view of a multichannel detector according to the invention;

FIG. 8 is a schematic detailed view of a primary mirror according to the invention and a secondary mirror according to the invention, each with structured sections;

FIG. 9*a* is a schematic detailed front view of a radiation detector according to the invention;

FIG. 9*b* is a schematic detailed front view of a radiation detector according to the invention;

FIG. 9*c* is a schematic detailed front view of a multichannel detector according to the invention;

FIG. 10 is a schematic detailed view of an embodiment of an optical measuring device according to the invention with a beam splitter and a second radiation detector.

DESCRIPTION OF PREFERRED EMBODIMENTS

Figure 1:
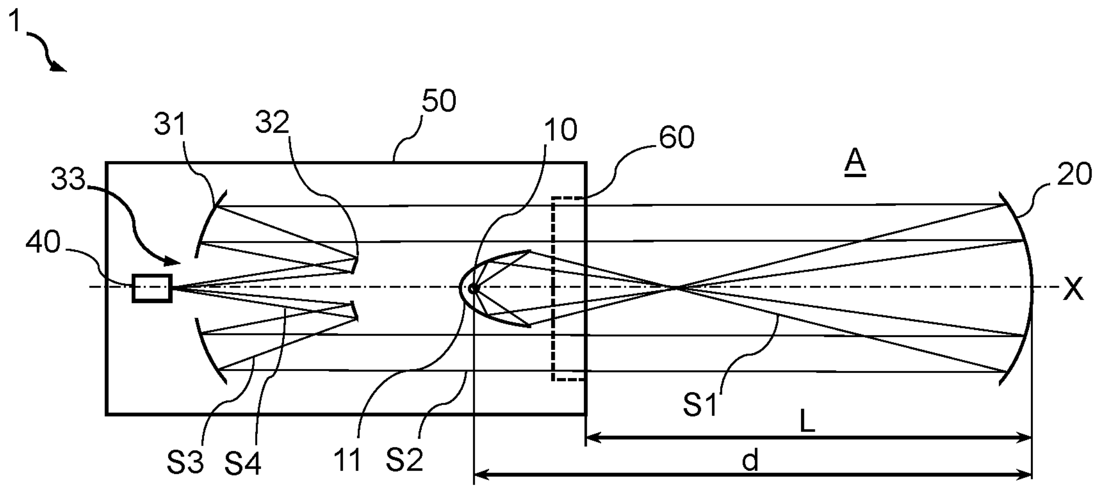
FIG. 1 is a schematic view showing an example of an optical measuring device according to the invention.

Referring to the drawings, FIGS. 1, 2, 3, 4, 5 and 10 show optical measuring devices 1 according to the invention or detailed views of optical measuring devices 1 according to the invention.

The optical measuring device 1 according to the invention is used to determine the concentration of measurement gas in a sample gas by light absorption.

As shown schematically in FIGS. 1, 2, 3, 4, 5 and 10, the optical measuring device 1 according to the invention comprises a light source 10, a deflecting mirror 20, a primary mirror 31, a secondary mirror 32 and a radiation detector 40.

Figure 2:
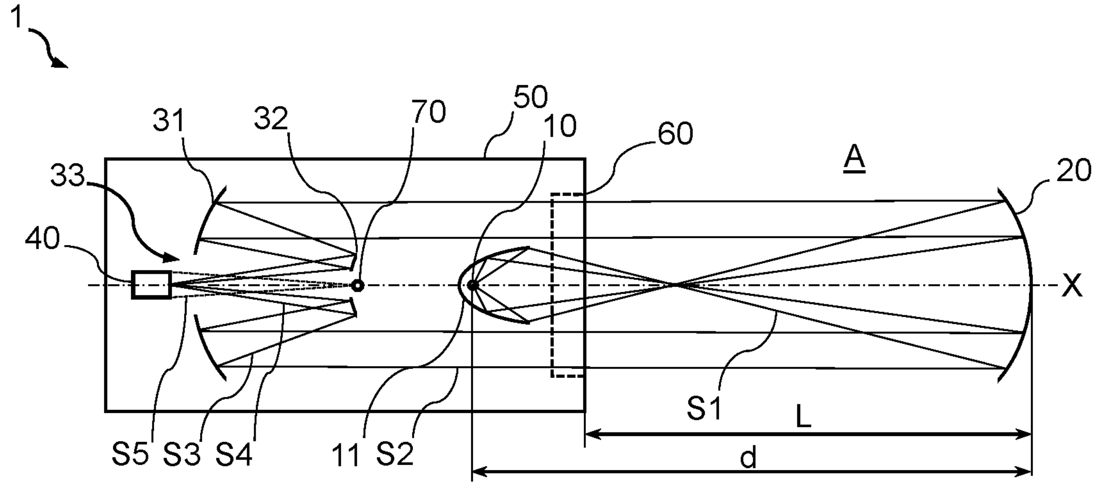
FIG. 2 is a schematic view showing an example of an optical measuring device according to the invention.
Figure 3:
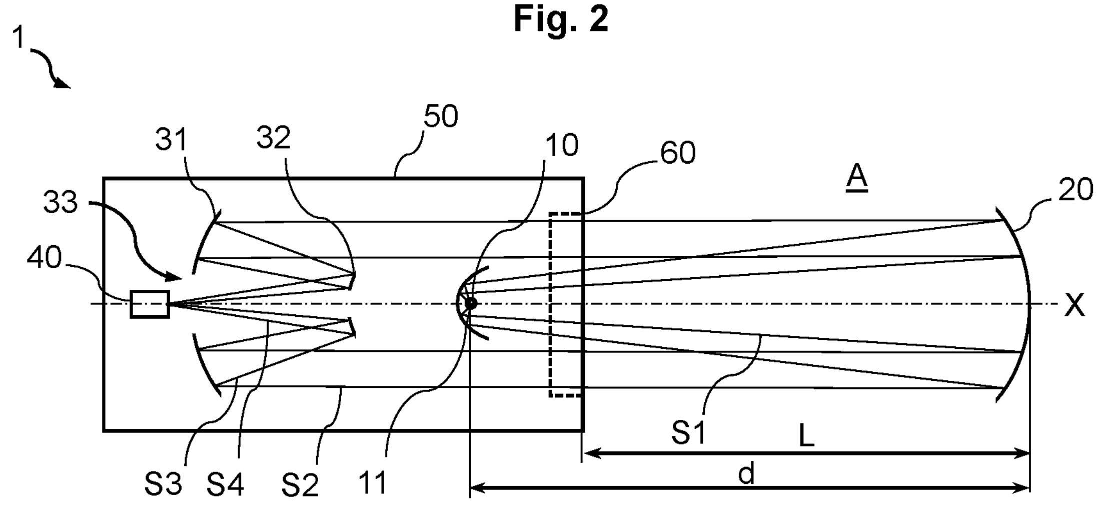
FIG. 3 is a schematic view showing an example of an optical measuring device according to the invention.

The light source 10 is configured to emit light in the direction of the deflecting mirror 20. For example, the light source 10 can be an incandescent lamp or a light-emitting diode and can also have a reflector 11. As shown in FIGS. 1 and 2, the reflector 11 can be an elliptical reflector 11 or, as shown in FIG. 3, an approximately spherical reflector 11. The optional reflector 11 is used to focus the light in the direction of the deflecting mirror 20.

The light emitted by the light source 10 in the direction of the deflecting mirror 20 and possibly bundled with the aid of the reflector 11 is shown in FIGS. 1, 2, 3 as a schematic beam S1.

A section A between the light source 10 and the deflecting mirror 20 is configured to receive the sample gas. Section A can be provided, for example, by a measuring cuvette or by an open measuring system as described above. Since the light advantageously passes through section A twice, it has an optical path length 2*L, where L indicates the length of section A. The optical path length 2*L is also referred to as the absorption length.

The deflecting mirror 20 is configured to act as a collimator for incident light, for example for the schematic beam S1, and to reflect the incident light, for example the schematic beam S1, deflected in the direction of the primary mirror 31. The light deflected in this way is shown in FIGS. 1, 2, 3, 4 and 5 as schematic beam S2. As shown in these figures, the light deflected in the direction of the primary mirror 31 is reflected essentially parallel to an optical axis X of the deflecting mirror 20 due to the effect of the deflecting mirror 20 as a collimator.

The primary mirror 31 and the secondary mirror 32 are configured to direct the light deflected by the deflecting mirror 20, for example the schematic beam S2, onto the radiation detector 40.

By providing the primary mirror 31 and the secondary mirror 32 and thus by providing a telescope arrangement, a compact design of the optical measuring device 1 can be achieved with a high focal length at the same time.

In the embodiments shown in FIGS. 1, 2, 3, 4, 5 and 10, the respective optical axes X of light source 10, deflecting mirror 20, primary mirror 31 and secondary mirror 32 are collinear to each other.

As described above, this leads to a folding of the beam path into itself. This can be seen in the schematic beam path in FIGS. 1, 2, 3, 4, 5 and 10. The light deflected by the deflecting mirror 20, shown schematically as beam S2, falls on the primary mirror 31, which reflects the beam S2, for example as beam S3, in the direction of the secondary mirror 32. Secondary mirror 32 in turn reflects beam S3, for example as beam S4, in the direction of radiation detector 40. Beams S2, S3 and S4 are folded into themselves, as can be seen in the figures mentioned. In this way, a symmetrical angle of incidence distribution can be advantageously generated with a compact configuration and long focal length.

The radiation detector 40 is configured to detect light in the ultraviolet and/or infrared wavelength range, for which purpose the radiation detector 40 has at least one detector element 41, shown schematically in FIGS. 7*a*, 7*b*, 7*c* and 9*a*, 9*b*, 9*c*. In a preferred embodiment of the invention, the radiation detector 40 can be a multi-channel detector which has at least one further detector element 41' in addition to the detector element 41. Such a multi-channel detector is shown schematically in FIGS. 7*c*, 9*c* and in FIGS. 4, 5, 10.

Preferably, and as shown in FIGS. 1, 2, 3, 4, 5 and 10, the radiation detector 40 is arranged such that the detector element 41 and possibly the further detector element 41' lie in a focus or a focal plane of the beam path. This can be achieved by suitably spacing the radiation detector 40 from the secondary mirror 32. However, it is not necessary for the detector element 41 and possibly the further detector element 41' to lie in a focus or a focal plane of the beam path.

According to the invention and shown schematically in FIGS. 1, 2, and 3, the light source 10, the primary mirror 31, the secondary mirror 32 and the radiation detector 40 are arranged in a common housing 50, with the deflecting mirror 20 being arranged outside the housing 50. In this preferred embodiment, the housing 50 comprises a translucent window 60 which is arranged in the beam path between the light source 10 and the deflecting mirror 20 so as not to obstruct the beam path but to physically close off the housing from the outside. In the illustrated embodiments, the window 60 is consequently arranged to transmit the exemplary beams S1 and S2. Preferably, the housing 50 is encapsulated in a pressure-tight manner and the window 60 is sealed gas-tight with respect to the housing 50.

In all of the illustrated embodiments of the optical measuring device 1, a distance d (shown in FIGS. 1, 2, 3) between the light source 10 and the deflecting mirror 20 can be variable along the optical axis X of the deflecting mirror 20 in order to adjust the absorption length. This can be achieved, for example, by variable-length mounting of the deflecting mirror 20 relative to the housing 50, for example by linear guidance of the deflecting mirror 20 in a spacer (mounting spacer) on the housing side.

Preferably, the deflecting mirror 20 in the illustrated embodiments is variable in terms of its curvature, as described above.

In the embodiments shown in FIGS. 1, 2, 3, 4, 5 and 10, the primary mirror 31 and the secondary mirror 32 can be configured as a Cassegrain telescope arrangement, which enables a particularly high focal length in a compact design.

In the illustrated embodiments according to FIGS. 1, 2, 3, 4, 5 and 10, the primary mirror 31 also preferably has a central recess 33 to extend the focal length in order to direct the light deflected by the secondary mirror 32, for example the beam S4, through the central recess 33 onto the radiation detector 40.

FIG. 2 shows that the optical measuring device 1 can also preferably comprise a second light source 70, which is configured to emit a second light, shown schematically in FIG. 2 as beam S5, in the direction of the radiation detector 40. The provision of a second light source 70 advantageously allows the compensation of a drift of the radiation detector 40.

Particularly preferably, the second light source 70 is provided collinear to the radiation detector 40, as shown, so that the radiation detector 40 is irradiated substantially perpendicularly.

Preferably, and as shown in FIG. 10, the optical measuring device 1 can comprise a second radiation detector 80 and a beam splitter 90. The beam splitter 90 can be arranged in the beam path in front of the radiation detector 40 in order to guide part of the light, for example beam S4, in the direction of the radiation detector 40, for example as schematic beam S4', and to guide another part of the light in the direction of the second radiation detector 90, for example as schematic beam S4".

In FIG. 10, the beam splitter 90 is configured as a dichroic or trichroic beam splitter, for example.

FIGS. 6, 8 show examples of a primary mirror 31 and secondary mirror 32 according to the invention. As can be seen in these figures, primary mirrors 31 and secondary mirrors 32 can be produced, for example, as essentially cylindrical basic bodies which have an optical surface F1 and F2 respectively. However, primary mirror 31 and secondary mirror 32 can also be provided in any other way as long as they have an optical surface F1 and F2, respectively.

As shown in FIGS. 6, 8, an optical surface F2 of the secondary mirror 32 and/or an optical surface F1 of the primary mirror 32 can have structured sections 34, 35 in order to influence a radiation distribution—shown schematically in FIGS. 7*a*, 7*b*, 7*c* and 9*a*, 9*b*, 9*c* as surfaces Va, Vb, Vc, Vd—on the radiation detector 40 and/or the second radiation detector 80, in particular to increase the radiation distribution Va, Vb, Vc, Vd.

The structured sections 34, 35 can, for example, be configured as facets 34 and/or grooves 35.

In the example shown in FIG. 6, the optical surface F2 of the secondary mirror 32 has structured sections 34 in the form of facets 34.

In the example shown in FIG. 8, the primary mirror 31 has structured sections 35 in the form of grooves 35 which run parallel to each other in a first orientation and the secondary mirror 32 has structured sections 35' in the form of grooves 35' which run parallel to each other in a second orientation. As shown, the primary mirror 31 and the secondary mirror 32 may be oriented relative to each other such that the first orientation and the second orientation are substantially perpendicular (essentially perpendicular) to each other.

FIG. 7*a* schematically shows a radiation distribution Va as it is generated with an optical measuring device 1 in which neither primary mirror 31 nor secondary mirror 32 have structured sections 34, 35, 35'. In this case, the radiation distribution Va is essentially circular.

FIGS. 7*b*, 7*c* show schematic radiation distributions Vb as generated with an optical measuring device 1 in which the primary mirror 31 and/or the secondary mirror 32 have structured sections 34 in the form of facets 34. In this case, the radiation distribution Vb is enlarged compared to the example shown in FIG. 7*a*. The radiation distribution Vb corresponds to a hexagon in the plane of the detector element 41, for example, in the event that only the primary mirror 31 or the secondary mirror 32 has structured sections 34 in the form of hexagonal facets 34.

In FIG. 5, a detailed view of an optical measuring device 1 schematically shows that the radiation distribution Va, Vb, Vc, Vd on the radiation detector 40 and/or the second radiation detector 80 can be influenced and, in particular, enlarged due to the structured sections 34, 35, 35'. This is illustrated schematically by means of the beam S3 which, after reflection by the secondary mirror 32, falls on the radiation detector 40 as beams S41, S42.

FIG. 9*a* schematically shows a radiation distribution Vc as generated with an optical measuring device 1, in which either the primary mirror 31 or the secondary mirror 32 have structured sections 35, 35' in the form of grooves 35, 35'. In this exemplary case, the radiation distribution Vc essentially corresponds to an elongated ellipse.

In the exemplary case shown in FIGS. 9*b*, 9*c*, the radiation distribution Vd essentially corresponds to a rectangle, for the case shown in FIG. 8 that both the primary mirror 31 and the secondary mirror 32 have the structured sections 35, 35' in the form of grooves 35, 35'.

In an embodiment shown in FIG. 4, the optical measuring device 1 also has an optical waveguide 100, which is arranged in the beam path in front of the radiation detector 40. In the example shown in FIG. 4, the optical waveguide 100 is a waveguide. Multiple reflections of the incident light, for example of the schematic beam S4, occur within the optical waveguide 100 and thus advantageously lead to a homogenization of the light distribution on the beam detector 40 or its detector element 41 (or detector elements 41, 41').

It is not shown that the optical measuring device 1 can also comprise a second optical waveguide, which can be arranged in the beam path in front of the second radiation detector 80.

All of the features disclosed herein can be combined with each other as desired, insofar as this does not affect alternatives or is contradictory.

While specific embodiments of the invention have been shown and described in detail to illustrate the application of the principles of the invention, it will be understood that the invention may be embodied otherwise without departing from such principles.

LIST OF REFERENCE CHARACTERS

1 Optical measuring device
10 Light source
11 Reflector
20 Directional mirror
31 Primary mirror
32 Secondary mirror
33 Recess
34, 35, 35' Structured sections
40 Radiation detector
41, 41' Detector element
50 Housing
60 Window
70 Second light source
80 Second radiation detector
90 Beam splitter
100 Optical waveguide
A Section
d Distance
F1, F2 Optical surface
L Length of the section
S1, S2, S3,
S4, S4', S4'',
S5, S41, S42 Beam
Va, Vb, Vc, Vd Radiation distribution
X Optical axis

What is claimed is:

1. An optical measuring device for determining the concentration of measurement gas in a sample gas by light absorption, the optical measuring device comprising:
- a light source;
- a deflecting mirror;
- a primary mirror;
- a secondary mirror;
- a radiation detector;
- a housing; and
- a second light source configured to emit a second light in a direction of the radiation detector,
- wherein the second light source is arranged collinearly with a central axis of the radiation detector,
- wherein a section between the light source and the deflecting mirror is arranged and configured to receive the sample gas,
- wherein the light source is arranged and configured to emit light in a direction of the deflecting mirror,
- wherein the deflecting mirror is arranged and configured to act as a collimator for incident light and to deflect incident light in a direction of the primary mirror,
- wherein the primary mirror and the secondary mirror are arranged and configured to direct light deflected by the deflecting mirror onto the radiation detector
- wherein respective optical axes of the light source, deflecting mirror, primary mirror and secondary mirror are collinear to each other,
- wherein the light source, the primary mirror, the secondary mirror and the radiation detector are arranged in the housing,
- wherein the deflecting mirror is arranged outside the housing,
- wherein the housing comprises a translucent window which is arranged in a light beam path between the light source and the deflecting mirror, and
- wherein the radiation detector is located on the optical axis of the primary mirror and secondary mirror.

2. The optical measuring device according to claim 1, wherein a distance between the light source and the deflecting mirror is variable along the optical axis of the deflecting mirror, whereby an absorption length is adjustable.

3. The optical measuring device according to claim 1, wherein the primary mirror and the secondary mirror are configured as a Cassegrain telescope arrangement.

4. The optical measuring device according to claim 3, wherein the Cassegrain telescope arrangement has no optical elements other than the primary mirror and the secondary mirror.

5. The optical measuring device according to claim 4, wherein the primary mirror has a central recess configured to direct light deflected by the secondary mirror through the central recess onto the radiation detector.

6. The optical measuring device according to claim 1, further comprising:
- a second radiation detector; and
- a beam splitter,
- wherein the beam splitter is arranged in the light beam path in front of the radiation detector and is configured to guide a part of the light in the direction of the radiation detector and to guide another part of the light in a direction of the second radiation detector.

7. The optical measuring device according to claim 6, wherein the radiation detector and/or the second radiation detector is a multi-channel detector.

8. The optical measuring device according to claim 6, wherein an optical surface of the secondary mirror and/or an optical surface of the primary mirror comprises structured portions configured to enlarge a radiation distribution on the radiation detector and/or to enlarge a radiation distribution on the second radiation detector.

9. The optical measuring device according to claim 1, wherein the radiation detector is a multi-channel detector.

10. The optical measuring device according to claim 1, wherein an optical surface of the secondary mirror and/or an optical surface of the primary mirror comprises structured portions configured to enlarge a radiation distribution on the radiation detector.

11. The optical measuring device according to claim 10, wherein structured portions of the optical surface of the secondary mirror and/or the optical surface of the primary mirror are spherical, hyperbolic or parabolic.

12. The optical measuring device according to claim 10, wherein structured portions of the optical surface of the secondary mirror and/or the optical surface of the primary mirror are configured as facets and/or as grooves.

13. The optical measuring device according to claim 12, wherein the facets are configured as a hexagonal elevation or recess, wherein a facet surface bounded by edges of the facet is convex, concave and/or flat.

14. The optical measuring device according to claim 1, further comprising an optical waveguide arranged in a light beam path in front of the radiation detector.

15. An optical measuring device for determining the concentration of measurement gas in a sample gas by light absorption, the optical measuring device comprising:

a light source;

a deflecting mirror;

a primary mirror;

a secondary mirror;

a radiation detector;

a housing; and a second light source configured to emit a second light in a direction of the radiation detector, wherein the second light source has a second light source longitudinal axis, wherein the second light source longitudinal axis is aligned with a central axis of the radiation detector, wherein a section between the light source and the deflecting mirror is arranged and configured to receive the sample gas, wherein the light source is arranged and configured to emit light in a direction of the deflecting mirror, wherein the deflecting mirror is arranged and configured to act as a collimator for incident light and to deflect incident light in a direction of the primary mirror, wherein the primary mirror and the secondary mirror are arranged and configured to direct light deflected by the deflecting mirror onto the radiation detector, wherein respective optical axes of the light source, deflecting mirror, primary mirror and secondary mirror are collinear to each other, wherein the light source, the primary mirror, the secondary mirror and the radiation detector are arranged in the housing, wherein the deflecting mirror is arranged outside the housing, wherein the housing comprises a translucent window which is arranged in a light beam path between the light source and the deflecting mirror, and wherein the radiation detector is located on the optical axis of the primary mirror and secondary mirror.

16. The optical measuring device according to claim 15, wherein the radiation detector is a multi-channel detector.

17. The optical measuring device according to claim 16, wherein structured portions of an optical surface of the secondary mirror and/or an optical surface of the primary mirror are spherical, hyperbolic or parabolic.

18. The optical measuring device according to claim 16, wherein structured portions of an optical surface of the secondary mirror and/or an optical surface of the primary mirror are configured as facets and/or as grooves.

19. The optical measuring device according to claim 18, wherein the facets are configured as a hexagonal elevation or recess, wherein a facet surface bounded by edges of the facet is convex, concave and/or flat.

* * * * *